United States Patent [19]

Ichimura et al.

[11] Patent Number: 5,297,050
[45] Date of Patent: Mar. 22, 1994

[54] DIRECTION SENSOR HAVING AN EARTH MAGNETISM SENSOR AND A RATE GYRO SENSOR AND NAVIGATION SYSTEM HAVING THIS DIRECTION SENSOR

[75] Inventors: Atsushi Ichimura; Yasuhiro Nakatani, both of Kobe, Japan

[73] Assignee: Fujitsu Ten Limited, Kobe, Japan

[21] Appl. No.: 788,456

[22] Filed: Nov. 6, 1991

[30] Foreign Application Priority Data

Nov. 6, 1990 [JP] Japan .................................. 2-298993
Nov. 6, 1990 [JP] Japan .................................. 2-298994

[51] Int. Cl.⁵ ...................... G06F 15/50; G01C 17/28
[52] U.S. Cl. ................................ 364/444; 364/449; 340/989; 340/995
[58] Field of Search ............... 364/449, 444, 443; 340/995, 989, 990; 33/361

[56] References Cited

U.S. PATENT DOCUMENTS

| | | | |
|---|---|---|---|
| 4,429,469 | 2/1984 | Tsushima et al. | 33/361 |
| 4,504,913 | 3/1985 | Miura et al. | 364/449 |
| 4,517,565 | 5/1985 | Nakamura et al. | 340/995 |
| 4,521,777 | 6/1985 | Nakamura et al. | 340/995 |
| 4,763,270 | 8/1988 | Itoh et al. | 364/449 |
| 4,827,420 | 5/1989 | Musa | 364/449 |
| 4,879,658 | 11/1989 | Takashima et al. | 364/449 |
| 5,046,011 | 9/1991 | Kakihara et al. | 364/449 |
| 5,109,344 | 4/1992 | Kakihara et al. | 364/449 |
| 5,151,862 | 9/1992 | Nakayama et al. | 364/454 |

FOREIGN PATENT DOCUMENTS

| | | |
|---|---|---|
| 0451988 | 10/1991 | European Pat. Off. |
| 59-218913 | 12/1984 | Japan . |
| 61-072618 | 5/1986 | Japan . |
| 62-163721 | 10/1987 | Japan . |
| 63-11810 | 1/1988 | Japan . |
| 63-150616 | 6/1988 | Japan . |
| 63-295913 | 12/1988 | Japan . |
| 1-035314 | 2/1989 | Japan . |
| 1-035315 | 2/1989 | Japan . |
| 1-035316 | 2/1989 | Japan . |
| 1-035317 | 2/1989 | Japan . |
| 1-035318 | 8/1989 | Japan . |
| 2216272 | 10/1989 | United Kingdom . |

Primary Examiner—Thomas G. Black
Assistant Examiner—Tan Q. Nguyen
Attorney, Agent, or Firm—Staas & Halsey

[57] ABSTRACT

The present invention involves a direction sensor and a navigation system containing the direction sensor. The direction sensor has an earth magnetism sensor and a rate gyro sensor that calculates a compensated direction by weighted means process of the outputs from the earth magnetism sensor and the rate gyro sensor. The compensated direction has a high detection accuracy similar to the rate gyro sensor over a short time period, but does not have an error accumulation of the rate gyro sensor during a long time interval because the rate gyro sensor is substantially calibrated with the accurate direction obtained by the averaging outputs of the earth magnetism sensor. The navigation system has distribution information of the magnetic disturbances to the earth magnetism on a map and it reduces the weighted mean ration to the earth magnetism sensor when the magnetic disturbance at the locating position is large. The accuracy of the compensated direction is further improved by excluding inaccurate outputs of the earth magnetism sensor.

7 Claims, 13 Drawing Sheets

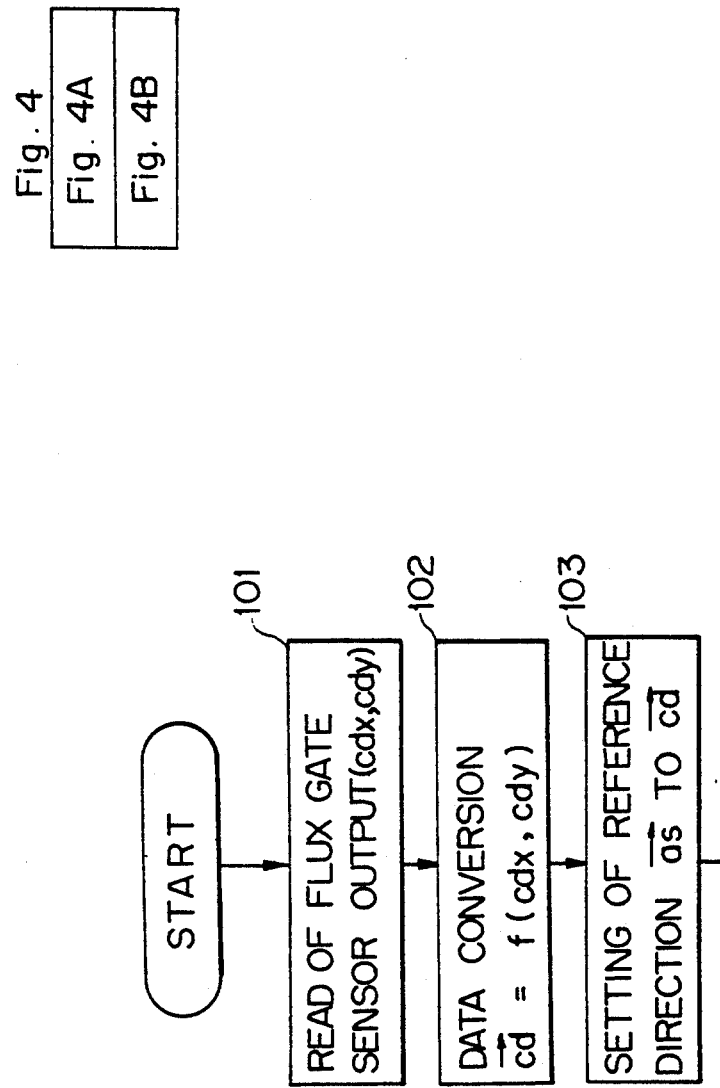

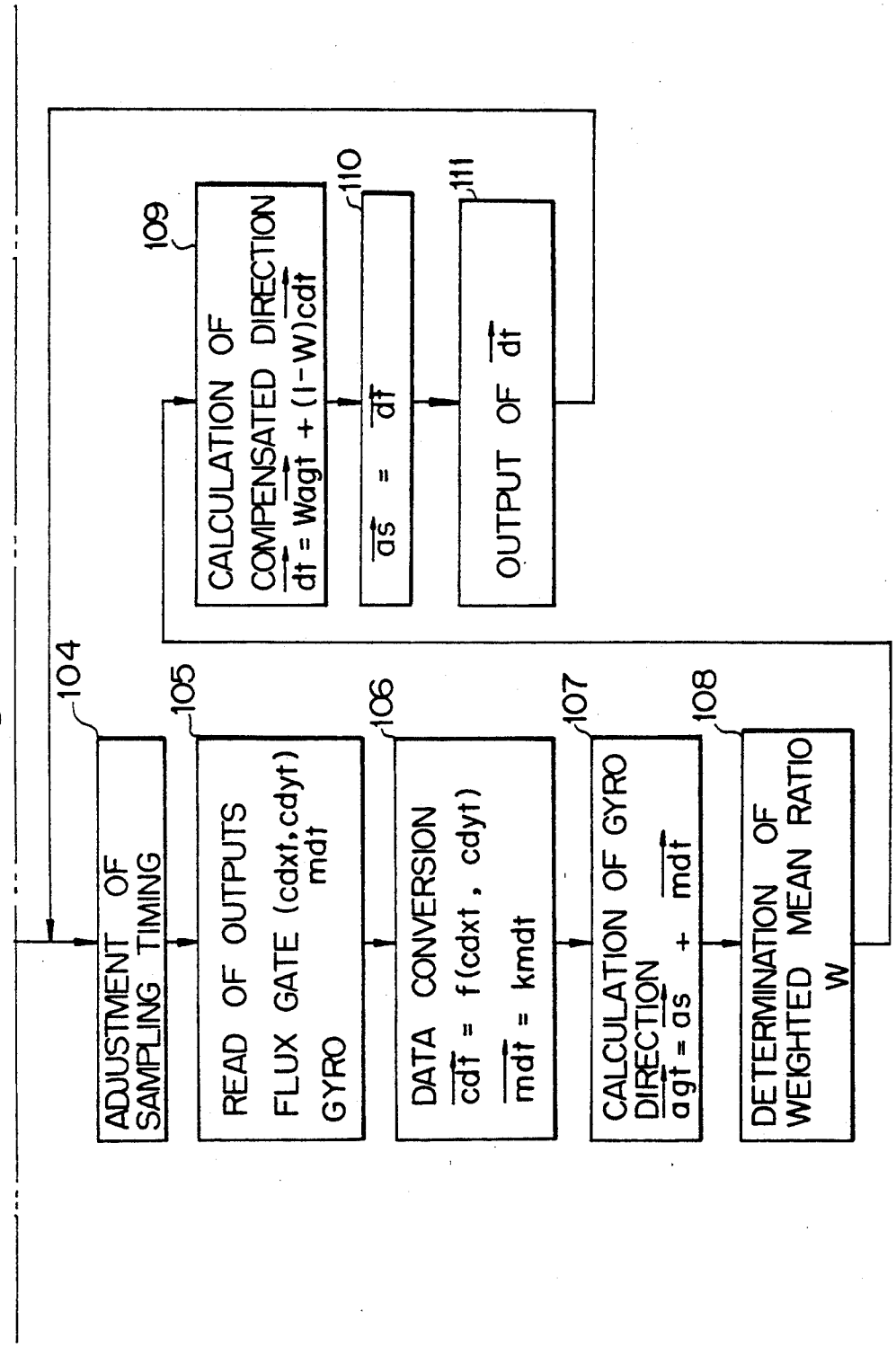

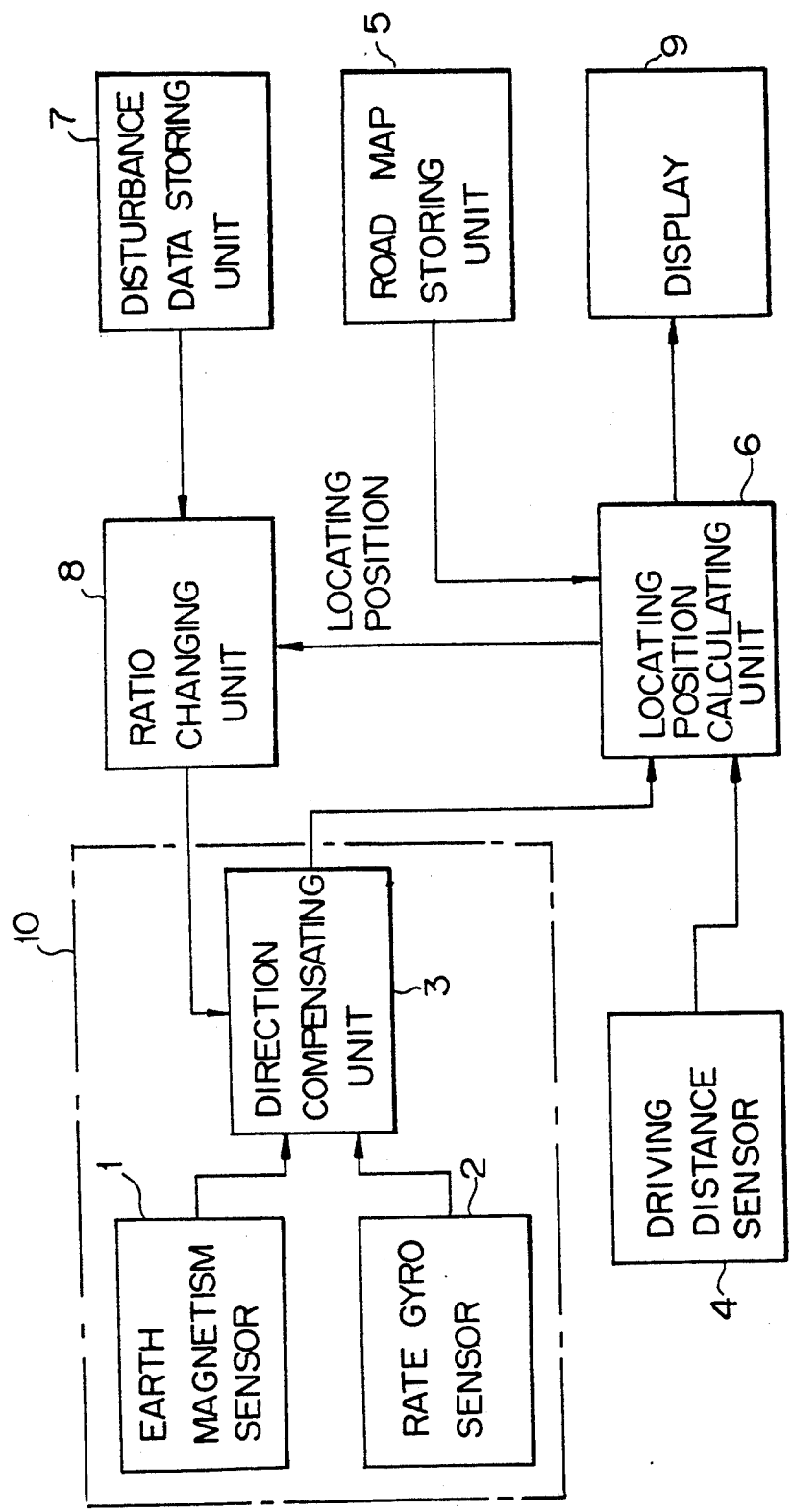

Fig. 10

| CLASS | NAME | NUMBER OF POINTS | POINT 1 | RADIUS 1 | POINT 2 | RADIUS 2 | ... |
|---|---|---|---|---|---|---|---|
| TOWER | TRANSMISSION STATION | 1 | $X_1, Y_1$ | $R_1$ | — | — | — |
| BRIDGE | IRON | 2 | $X_{21}, Y_{21}$ | $R_{21}$ | $X_{22}, Y_{22}$ | $R_{22}$ | — |
| RAILROAD | CROSSING | 1 | $X_3, Y_3$ | $R_3$ | — | — | — |
| RAILROAD | CROSSING | 1 | $X_4, Y_4$ | $R_4$ | — | — | — |
| BUILDING | BUILDING | 1 | $X_5, Y_5$ | $R_5$ | — | — | — |
| ROAD | HIGH LEVEL | 30 | $X_{61}, Y_{61}$ | $R_{61}$ | $X_{62}, Y_{62}$ | $R_{62}$ | $X_{63}, Y_{63}$ |
| ... | | ... | ... | ... | ... | ... | ... |

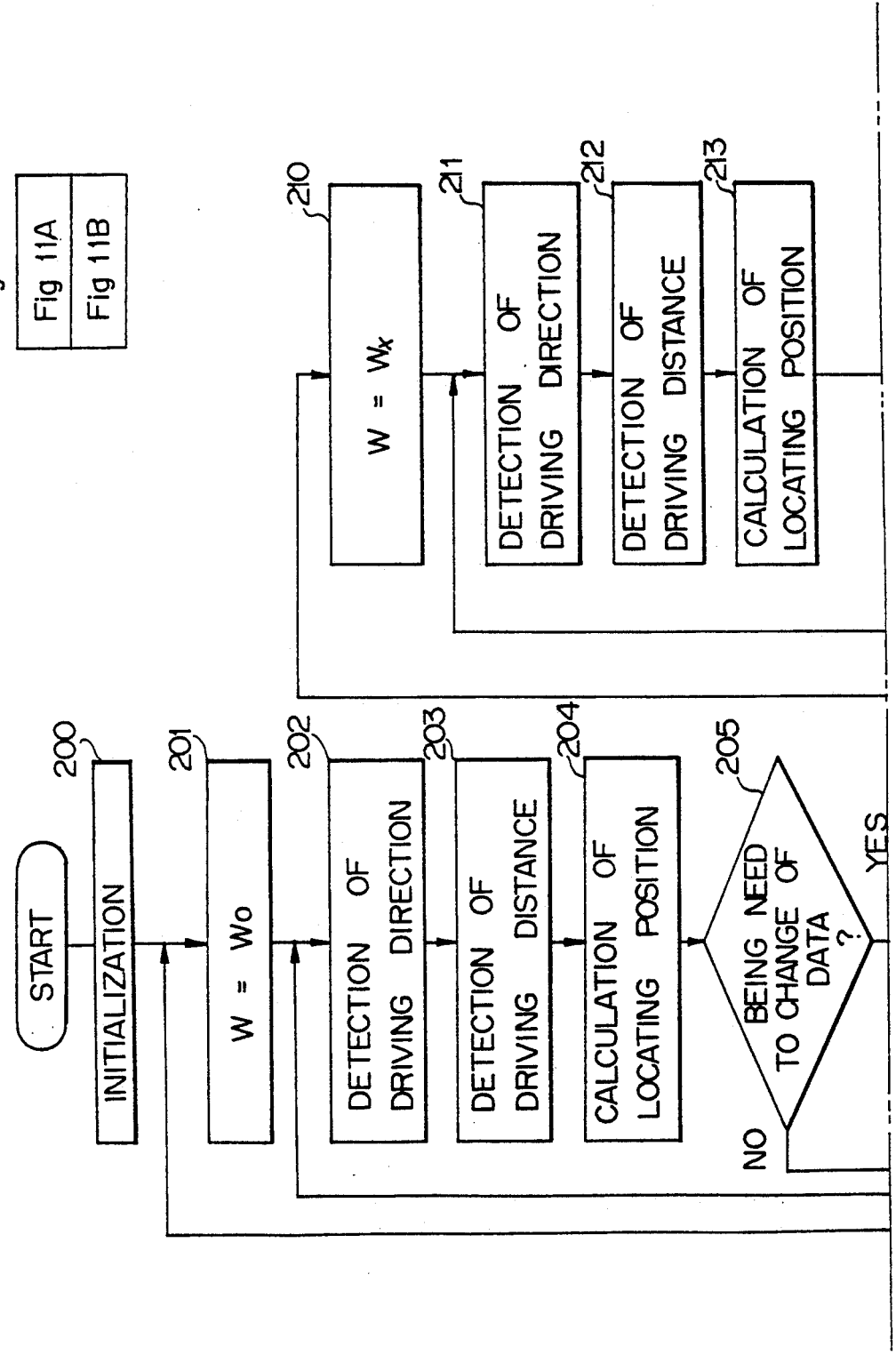

DIRECTION SENSOR HAVING AN EARTH MAGNETISM SENSOR AND A RATE GYRO SENSOR AND NAVIGATION SYSTEM HAVING THIS DIRECTION SENSOR

BACKGROUND OF THE INVENTION (1) Field of the Invention

The present invention relates to a direction sensor having an earth magnetism sensor and a rate gyro sensor, and a navigation system of a vehicle having this direction sensor for locating a position on a map. More particularly, this invention relates to an improvement in detection accuracy of a driving direction sensor and navigation system.

(2) Description of the Related Art

Vehicles are recently equipped with a navigation system that detects driving paths, displays the driving position on a map and offers various instructions to aid a driver. The navigation system includes a driving direction sensor and a driving distance sensor, and calculates a position on a map from the driving direction and the driving distance. The direction sensor used in the above system is required to detect the absolute direction corresponding to the direction on a map.

Two types of direction sensors are generally used in the navigation system. One type is a rate gyro sensor that detects a rotation speed and calculates a rotated angle from a reference direction. A conventional gyro having a gimbal, an optical fiber gyro and a gas rate sensor are included in this rate gyro sensor. The rate gyro sensor generally has characteristics such that the detection accuracy is very high when detecting during a short time range, but the accuracy deteriorates when detecting over a long time range due to the accumulation of errors. Therefore, the rate gyro sensor needs to be periodically calibrated. This calibration is performed by or with reference to the absolute direction. Further, the rate gyro sensor needs to be initialized to set the reference direction at a start of the operation because it calculates the rotated angle from the reference direction. This initialization is also performed by or with reference to the absolute direction and the calibration is substantially equal or similar in procedure as the initialization.

The other type of direction sensor is an earth magnetism sensor that detects a forward angle of a vehicle relative to magnetic north of earth and calculates an absolute direction on a map. The earth magnetism sensor has an advantage in that it can detect an absolute direction and detecting errors do not accumulate. However, because the intensity of earth magnetism is as low as 0.3 Gauss, the detection of earth magnetism is disturbed by various external magnetic factors such as polarization of a vehicle body, and a magnetic field produced due to electrical equipment of a vehicle. Further, various facilities such iron bridges, large buildings, high level roads and tunnels also disturb the earth's magnetic field. These disturbances cause errors in the detection of the earth magnetism sensor. Various methods are proposed for compensating the disturbance due to polarization of vehicle body and the disturbance has been reduced by using these methods. However, the disturbances due to facilities such as bridges, buildings, etc. cannot be adequately compensated because these disturbances exist at random.

As the rate gyro sensor and the earth magnetism sensor respectively have the above-mentioned characteristics, a conventional navigation system generally comprises both a rate gyro sensor and an earth magnetic sensor and calculates a precise driving direction by compensating or correcting each other's detection results. For example, in a navigation system disclosed in Japanese Unexamined Utility Model Publication (Kokai) No. 62-163721, the errors of earth magnetism due to the polarization of a vehicle is compensated for by the difference of the outputs of the earth magnetism sensor and the rate gyro sensor.

In the most orthodox system, the rate gyro sensor is normally used as a driving direction sensor, and the output of the earth magnetism sensor is used only as a reference direction for the initialization and the periodical calibrations of the rate gyro sensor. This system has problems in that the reference direction obtained from the earth magnetism sensor is not necessarily precise and the accumulation of errors of the rate gyro sensor is not reduced.

In a navigation system disclosed in Japanese Unexamined Utility Model Publication (Kokai) No. 62-163721, the errors of an earth magnetism sensor due to the polarization of a vehicle is compensated for by the difference of the outputs of the earth magnetism sensor and the rate gyro sensor.

In a navigation system disclosed in Japanese Unexamined Utility Model Publication (Kokai) No. 61-72618, the earth magnetism sensor is normally used as a driving direction sensor and the rate gyro sensor is used when the magnetic field of the location position seems to be disturbed more than a predetermined level. The intensity of the disturbance is determined according to the difference between the outputs of the earth magnetism sensor and the rate gyro sensor in a short time range or interval. However, if the magnetic field of the earth magnetism is uniformly disturbed in a wide range or long time interval, for example, when driving along a railroad or a transmission line, the incorrect output of the earth magnetism sensor is always used because the difference in the short time range is always small under this condition since the disturbance is slowly accumulated.

In another navigation system disclosed in Japanese Unexamined Patent Publication (Kokai) No. 64-353314, information relating to specific facilities that largely influence the earth magnetic field and the influence patterns of the facilities to the magnetic field is disclosed. The earth magnetism sensor detects these changes of the magnetic field due to the specific facilities. The navigation system determines positions of the specific facilities and compensates the locating position according to the positions of the specific facilities. This system normally uses the rate gyro sensor as the driving direction sensor and initializes the rate gyro sensor by the above detected positions. However, the influence pattern of the facility to the magnetic field is very complex. Therefore, it is not easy to determine the facility position according to the detected changes of the magnetic field. Further, when there is no specific facility in a wide range or area, the driving direction is determined only by the rate gyro sensor. Therefore, this system also has a disadvantage in that the error accumulation of the rate gyro sensor increases.

SUMMARY OF THE INVENTION

An object of the present invention is to improve the detection accuracy of the driving direction of a navigation system having an earth magnetism sensor and a rate gyro sensor and calculating the compensated driving direction from both outputs, and especially, to propose a better compensation method of outputs of an earth magnetism sensor and a rate gyro sensor.

According to one aspect of the present invention, the navigation system includes an earth magnetism sensor, a rate gyro sensor and a driving direction compensating means. The driving direction compensating means calculates the compensated driving direction by a weighted mean of outputs of the earth magnetism sensor and the rate gyro sensor, and the compensated driving direction is set as a reference direction of the rate gyro sensor.

As described in the above, the rate gyro sensor has a very high accuracy in or over a short time range. On the other hand, the detection accuracy of the earth magnetism sensor is disturbed by external factors due to facilities and topographical conditions. However, the average value of outputs of the earth magnetism sensor over a long time range or period is disposed to converge to a correct value. Therefore, the compensated driving direction obtained by the weighted mean process with a heavy ratio to the rate gyro sensor has an accuracy similar to the rate gyro sensor in or during a short time range. In addition, by repeating the setting process of the obtained compensated driving direction to the reference direction of the rat gyro sensor and the above sampling process by turns or by alternating, the detection errors of the earth magnetism sensor are averaged and the rate gyro sensor is calibrated by the precise direction. Consequently, the direction sensor has a high level accuracy corresponding to the rate gyro sensor in a short time range; and it has no accumulation of errors in a long time range.

According to the another aspect of the present invention, the navigation system includes an above direction sensor, and further includes a driving distance sensor, a road map storing means for storing information relating to a road map, and a locating position calculating means for calculating a locating position on a road map. In addition, the invention includes a disturbance data storing means for storing distribution information of a magnetic disturbance to the earth magnetism in a form corresponding to the road map, and a ratio changing means for detecting an intensity of magnetic disturbance at the locating position and changing the ratio of the weighted mean process according to the magnetic disturbance intensity.

The distribution of the magnetic disturbance due to facilities and topographical factors is stable over a long time range. Therefore, if the navigation system reduces a contribution ratio of the output of the earth magnetism sensor in the high disturbance range, the accuracy of the obtained driving direction is improved.

BRIEF DESCRIPTION OF THE DRAWINGS

The present invention will be more clearly understood from the description as set forth below with reference to the accompanying drawings, wherein:

FIG. 4 comprises FIGS. 4A and 4B which show a flow-chart of an operation of a microcomputer shown in FIG. 2;

FIG. 7 shows a fundamental construction of a navigation system of the invention;

FIG. 10 shows an example of the format of magnetic disturbance data;

DESCRIPTION OF THE PREFERRED EMBODIMENTS

Figure 1:
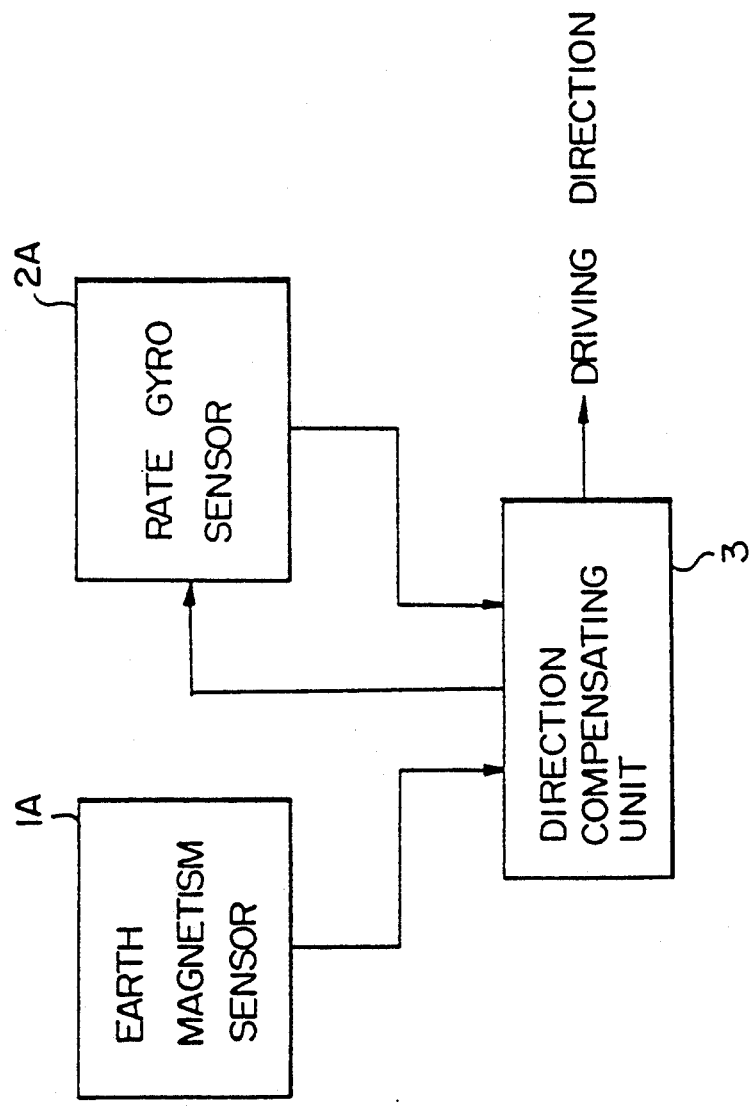
FIG. 1 shows a fundamental construction of a direction sensor of the invention.

FIG. 1 shows a fundamental construction of a driving direction sensor according to the present invention. As shown in FIG. 1, this driving sensor includes an earth magnetism sensor 1A, a rate gyro sensor 2A and a direction compensating unit 3. The earth magnetism sensor 1A detects an angle of the driving direction relative to a magnetic north of earth magnetism and calculates the driving direction on a map. A flux gate sensor is a typical example of the earth magnetism sensor 1A. The rate gyro sensor 2A detects a rotating speed of an object to which the rate gyro sensor 2A is attached, calculates a rotated angle from the detected rotating speed, and then outputs a driving direction obtained by adding the rotated angle to a reference direction. The direction compensating unit 3 calculates a compensated driving direction by a weighted mean process using the outputs from the earth magnetism sensor 1A and the rate gyro sensor 2A as inputs and sets the compensated direction as a reference direction of the rate gyro sensor 2A.

Figure 2:
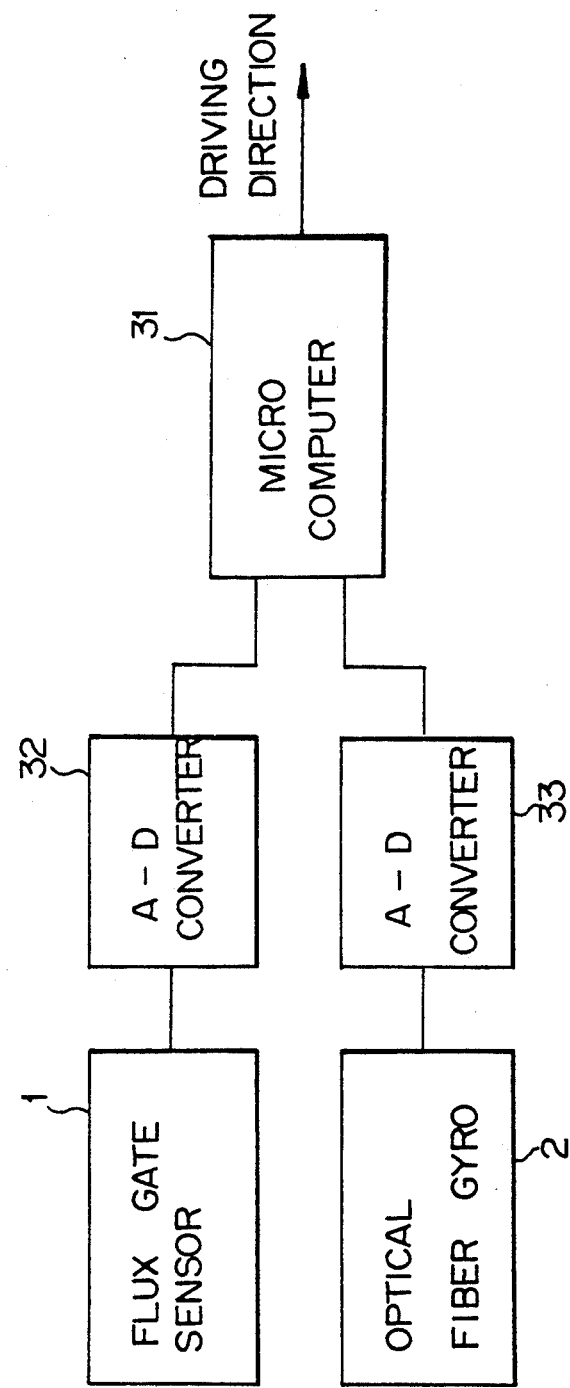
FIG. 2 shows a construction of a direction sensor of an embodiment of the present invention.
Figure 3:
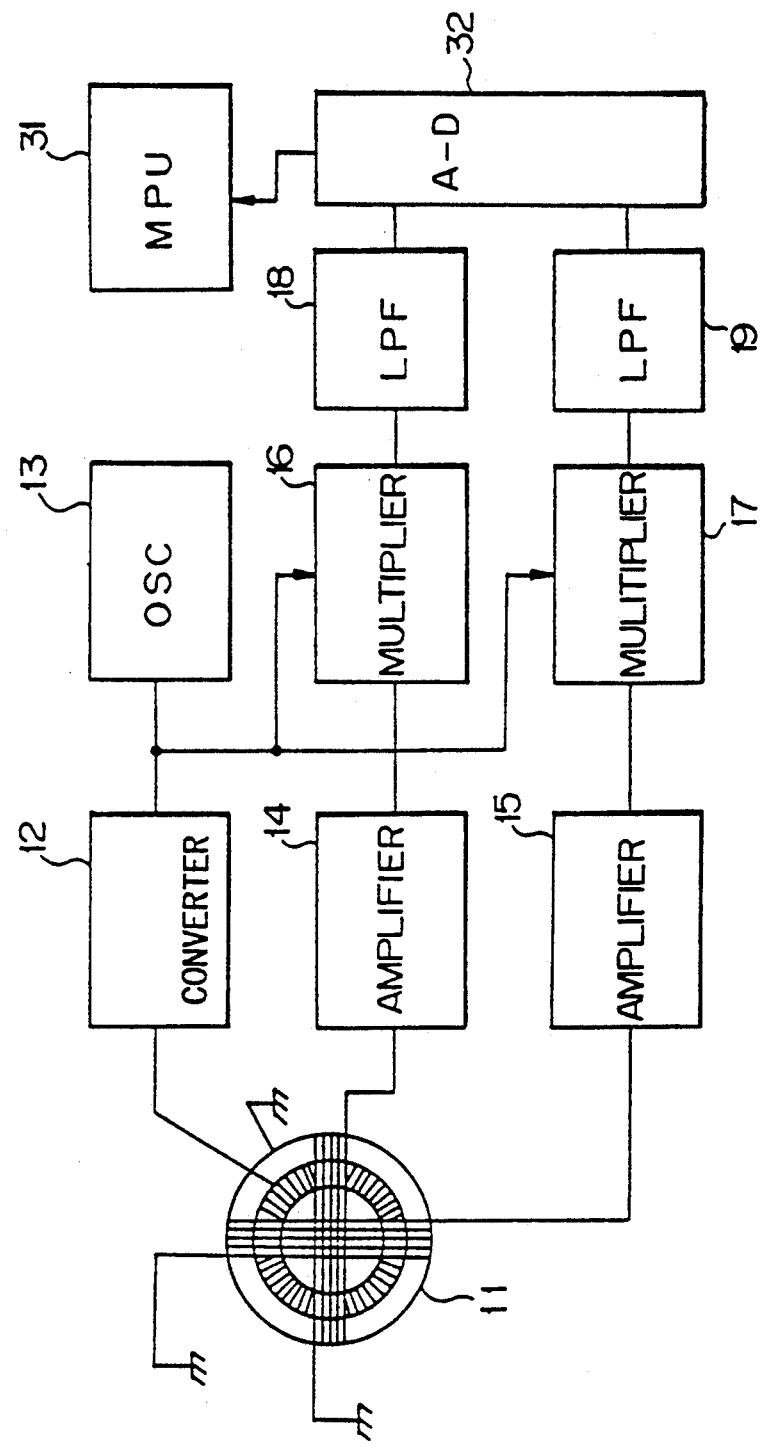
FIG. 3 shows a construction of a flux gate sensor used in the direction sensor.

The above driving direction sensor is practically realized by using a microcomputer. FIG. 2 shows a construction of the driving direction sensor of an embodiment. In this embodiment, a flux gate sensor 1 corresponds to the earth magnetism sensor and an optical fiber gyro 2 corresponds to the rate gyro sensor. FIG. 3 shows a detailed construction of the flux gate sensor 1. A detailed explanation of the construction shown in FIG. 3 has been omitted because it is well known. The flux gate sensor outputs two voltage, signals corresponding to an X direction component and a Y direction component of earth magnetism. The above X and Y directions are directions of the flux gate sensor 1, namely a forward direction of a vehicle and a perpendicular direction to the above direction.

In FIG. 2, the output of the flux gate sensor 1 is converted to digital signals by an analog-to-digital (A-D) converter 32. The microcomputer 31 periodically reads these output signals and calculates a first driving direction on a map from the output of the flux gate sensor 1 by compensating the difference between the map north and the earth magnetism north. Similarly, the optical fiber gyro 2 outputs a signal corresponding to the rotating angular speed and the output signal also converted to a digital signal by a A-D converter 33. The microcomputer 31 periodically reads this signal and calculates a rotated angle from a reference direction. This reference direction is stored in the microcomputer 31. The microcomputer 31 calculates a second driving direction by adding the rotated angle to the reference direction. The microcomputer 31 further calculates a compensated driving direction from the first and second driving directions and sets the compensated driving direction as the reference direction. Namely, in this embodiment, the microcomputer 31 performs the calculating processes of the flux gate sensor 1 and the optical fiber gyro 2 in addition to the calculating process of the compensated driving direction. This detection process of the driving direction is performed at a predetermined period.

A flow-chart as shown in FIGS. 4A and 4B shows the calculating operation of the microcomputer 31 for obtaining the compensated driving direction. At the beginning, the initialization of the optical fiber gyro 2 is performed by setting the reference direction to the first driving direction. At step 101 of FIG. 4A, the microcomputer 31 reads outputs (cdx, cdy) of the flux gate sensor 1 and converts these output data to a first driving direction $\vec{cd}$ at step 102. At step 103, the reference direction $\vec{as}$ is set to this $\vec{cd}$.

As described in the above, because detections of the compensated driving direction are performed at the predetermined sampling terms, the microcomputer performs a counting operation for adjusting the sampling timing at step 104 in FIG. 4B. At step 105, the microcomputer 31 reads the outputs (cdx$_t$, cdy$_t$) of the flux gate sensor 1 and the output md$_t$ of the optical fiber gyro 2. These output data are respectively converted to the first driving direction $\vec{cd_t}$ and the rotated angle $\vec{md_t}$ at step 106. At step 107, the second driving direction $\vec{ag_t}$ is calculated by adding the rotated angle $\vec{md_t}$ to the reference angle $\vec{as}$.

At step 108, the weighted mean ratio W is determined. The determination process of this ratio W will be explained later. If this ratio is constant, this step 108 can be excluded. At step 109, the compensated driving direction $\vec{d_t}$ is obtained by calculating the weighted mean of the first driving direction $\vec{cd_t}$ and the second driving direction $\vec{md_t}$ according to the following equation (1).

$$\vec{d_t} = (1-W) \times \vec{cd_t} + W \times \vec{ag_t} \tag{1}$$

The compensated diving direction $\vec{d_t}$ is set to the reference direction in step 110. The microcomputer 31 outputs this compensated driving direction to the navigation system at step 111. And then, the control returns to step 104, and repeats steps 104 through 111.

In the following, the error of the compensated driving direction $\vec{d_t}$ in or during a short time range or period and a long time range is explained. As described in the above, an output of the earth magnetism sensor, such as a flux gate sensor 1, has a random error due to external disturbances. Now, it is supposing or assumed that the first driving direction $\vec{cd_t}$ detected at a specific sampling timing has a direction error $\vec{a_t}$ and the correct direction at that time is $\vec{x_t}$. The first driving direction $\vec{cd_t}$ is expressed by a following equation (2).

$$\vec{cd_t} = \vec{x_t} + \vec{a_t} \tag{2}$$

The rate gyro sensor, such as an optical fiber sensor 2, detects a rotating speed and calculates a rotated angle from a reference angle. The detection error of the rotating speed changes due to factors such as temperature, however, it is nearly or usually constant. This error is very small in a high precision rate gyro sensor such as the type included in this invention. The rotated angle is obtained by multiplying the rotating speed by the time duration. Therefore, the rotated angle has an error proportional to the error of the rotating speed. Now, it is supposed that the detection error of the rotated angle at a specific sample timing has a constant error $\vec{g}$ and the correct direction at that time is also $\vec{x_t}$. Because the conventional rate gyro sensor detects the rotated angle at a predetermined sampling cycle and calculates the direction by adding the rotated angle to the reference direction, and further sets the calculated direction to the reference direction, the detected direction $\vec{ag_t}$ at t times is expressed by the following equation (3).

$$\vec{ag_t} = \vec{x_t} + t \times \vec{g} \tag{3}$$

As shown in the equation (3), the detection error of the rate gyro sensor accumulates with the sample number. In the following description, the first reference direction is supposed or assumed to be set in the correct direction.

The first driving direction $\vec{cd_1}$ and the second driving direction detected $\vec{ag_1}$ at the first sampling time are respectively expressed by following equations (4) and (5).

$$\vec{cd_1} = \vec{x_1} + \vec{a_1} \tag{4}$$

$$\vec{ag_1} = \vec{x_1} + \vec{g} \tag{5}$$

The compensated driving direction $\vec{d_1}$ obtained by weighted mean with a ratio W expressed by the following equation (6).

$$\begin{aligned}\vec{d_1} &= (1-W) \times (\vec{x_1} + \vec{a_1}) + W \times (\vec{x_1} + \vec{g}) \\ &= \vec{x_1} + (1-W) \times \vec{a_1} + W \times \vec{g}\end{aligned} \tag{6}$$

Consequently, the compensated driving direction obtained at the first sampling has an error $e_1$ expressed by the following equation (7).

$$\vec{e_1} = (1-W) \times \vec{a_1} + W \times \vec{g} \tag{7}$$

When the ratio W is 0.9, the influence of the external magnetic disturbance is reduced to 1/10. And at that time, the error $\vec{g}$ of the rate gyro becomes only 9/10. However, because the error $\vec{g}$ is very small, the error $\vec{g}$ does not influence the compensated driving direction. If the ratio W is nearer to 1, the influence of the magnetic disturbance is smaller. In practice, the ratio W is between 1/100 to 1/5000 for a 0.5 second sampling term. Therefore, although the detection error $a_1$ due to the intensity of the magnetic disturbance is large, the error of the compensated driving direction is not large.

After setting the above compensated driving direction $\vec{d_1}$ as the reference direction, the second sampling is performed after the predetermined term. The driving directions obtained at the second sampling process are expressed by the following equations (8) and (9).

$$\vec{cd_2} = \vec{x_2} + \vec{a_2} \quad (8)$$

$$\vec{ag_2} = \vec{x_2} + (1-W) \times \vec{a_1} + W \times \vec{g} + \vec{g} \quad (9)$$

The second compensated driving direction $\vec{d_2}$ obtained from above $\vec{cd_2}$ and $\vec{ag_2}$ is expressed by the following equation (10).

$$\vec{d_2} = \vec{x_2} + W \times (W-1) \times \vec{g} + (1-W) \times (W \times \vec{a_1} + \vec{a_2}) \quad (10)$$

After repeating these process for k times, the obtained compensated driving direction $\vec{d_k}$ is expressed by the following equation (11).

$$\begin{aligned}\vec{d_k} &= \vec{x_k} + W \times (W^{k-1} + W^{k-2} + \ldots + 1) \times \vec{g} + \\ &\quad (1-W) \times (W^{k-1} \times \vec{a_1} + W^{k-2} \times \vec{a_2} + \ldots + \vec{a_k}) \\ &= \vec{x_k} + W \times (W^k - 1)/(W-1) \times \vec{g} + \\ &\quad (1-W)(W^{k-1} \times \vec{a_1} + \ldots + \vec{a_k})\end{aligned} \quad (11)$$

Because W is less than 1, the second term of the equation (11) becomes negligible and can be eliminated when the sampling times k becomes very large. Consequently, the equation (11) reduces to the following equation (12).

$$dk_k = \vec{x_k} + W/(1-W) \times \vec{g} + (1-W)(W^{k-1}\vec{a_1} + \ldots + \vec{a_k}) \quad (12)$$

Further, the errors of the earth magnetism sensor due to the external magnetic disturbance is disposed or close to zero by averaging sampling values for a long time. Therefore, the third term of the equation (12) is negligible. Then, the equation (12) is or reduces to the following equation (13).

$$\vec{d_k} = \vec{x_k} + W/(1-W) \times \vec{g} \quad (13)$$

When the ratio W is 0.9, the equation (13) shows that the error of the compensated driving direction is 9 * $\vec{g}$. As described already, the error $\vec{g}$ is very small, therefore, this error is not the problem. If the ratio W becomes nearer to 1, the error of the compensated driving direction $\vec{d_k}$ becomes larger and is not negligible. Therefore, the ratio W needs to be determined by considering the error of the rate gyro.

As described above, the driving direction sensor according to the present invention maintains accuracy in a long time range and also is accurate in a short time range because the compensation process by the first driving direction of the earth magnetism sensor having sudden errors is not performed.

Figure 5:
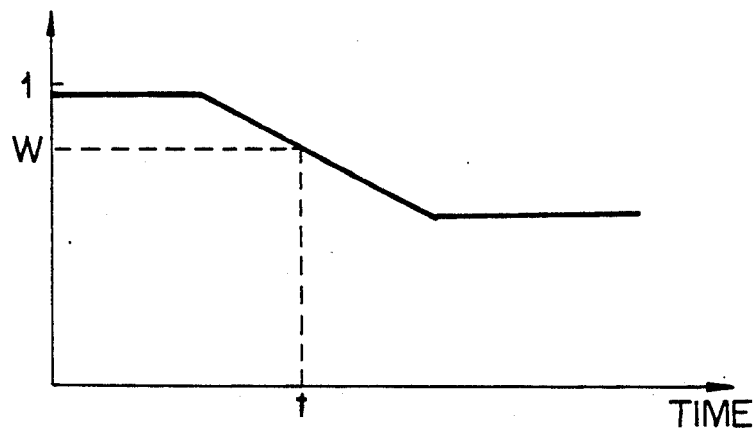
FIG. 5 shows an example of a function of a weighted mean ratio which changes according to a driving time of a vehicle.

In the above embodiment, the weighted mean ratio W is constant. However, the detection accuracy of the direction sensor can be improved by changing the ratio W according to specific functions. FIG. 5 shows an example of the function in which the ratio W changes according to the operation time of the direction sensor from the start initialization. As described in the above, since the rate gyro sensor has a high detection accuracy over a short time range, the rate gyro sensor influences more the compensated direction by setting the ratio W near to 1 and the influence of the error of the earth magnetism sensor can be reduced. Then, when the errors of the rate gyro sensor accumulate after a long period of time, the averaged errors of the earth magnetism sensor, namely, the absolute direction greatly influences the compensated direction by decreasing the ratio W.

Figure 6:
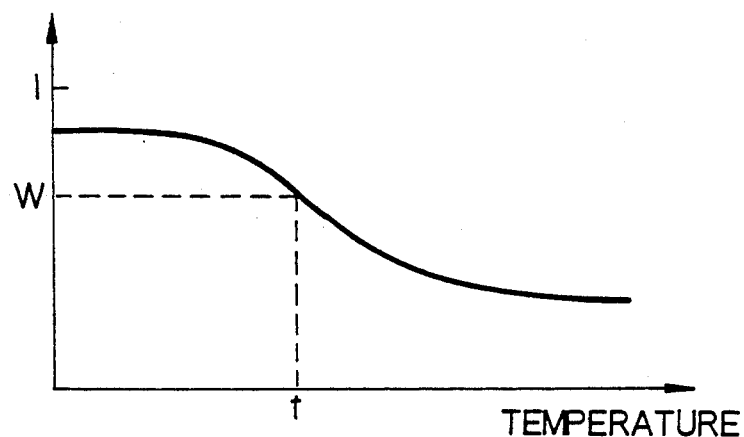
FIG. 6 shows an another example of a function of a weighted mean ratio which changes according to a temperature.

The detection error of the rate gyro sensor generally changes according to the temperature of the sensor. FIG. 6 shows another example of the function in which the ratio W changes according to the temperature of the rate gyro sensor or the environmental temperature. In order to realize this embodiment, the construction of the direction sensor as shown in FIG. 2 also includes a temperature sensor (not shown). As the detection error of the rate gyro sensor generally increases according to the increase in temperature, the ratio W is nearer to 1 and the rate gyro sensor contributes to the compensated direction when the temperature is low.

Next, an embodiment of a navigation system having the above direction sensor is described. As described above, the earth magnetism is disturbed by various external magnetic factors. In these external magnetic factors, the disturbance of specific facilities and topographical factors cannot be compensated for because these influences occur at random. Consequently, the detected direction of the earth magnetism sensor has a large error at the positions in which the level of magnetic disturbance is large. Since the above direction sensor obtains the compensated direction by weighted mean process of outputs of the earth magnetism sensor and the rate gyro sensor, the error of the earth magnetism sensor due to external disturbance is reduced in the compensated direction. However, the accuracy of the compensated direction can be further improved by excluding the inaccurate output of the earth magnetism sensor from the calculation. Therefore, this navigation system has distribution information of the magnetic disturbance to the earth magnetism in a form corresponding to the road map and changes the ratio W according to the magnetic disturbance intensity at the locating position. This distribution information of the magnetic disturbance is previously detected and stored in a storing unit.

FIG. 7 shows a fundamental construction of a navigation system according to the invention. Similar to a conventional navigation system, this navigation system includes a driving direction sensor 10, a driving distance sensor 4, a road map storing unit 5, a locating position calculating unit 6, and a display 9. The driving direction sensor 10 is the above-mentioned direction sensor. This navigation system further includes a disturbance data storing unit 7 and a ratio changing unit 8. The disturbance data storing unit 7 stores information for showing magnetic disturbance intensities on the road map. The ratio changing unit 8 receives a locating position from the locating position calculating unit 6, and detects the magnetic disturbance intensity at the locating position from the disturbance data storing unit 7. In addition, the ratio changing unit 8 calculates the ratio W corresponding to the magnetic disturbance intensity, and then outputs the ratio W to the direction compensating unit 3.

Figure 8:
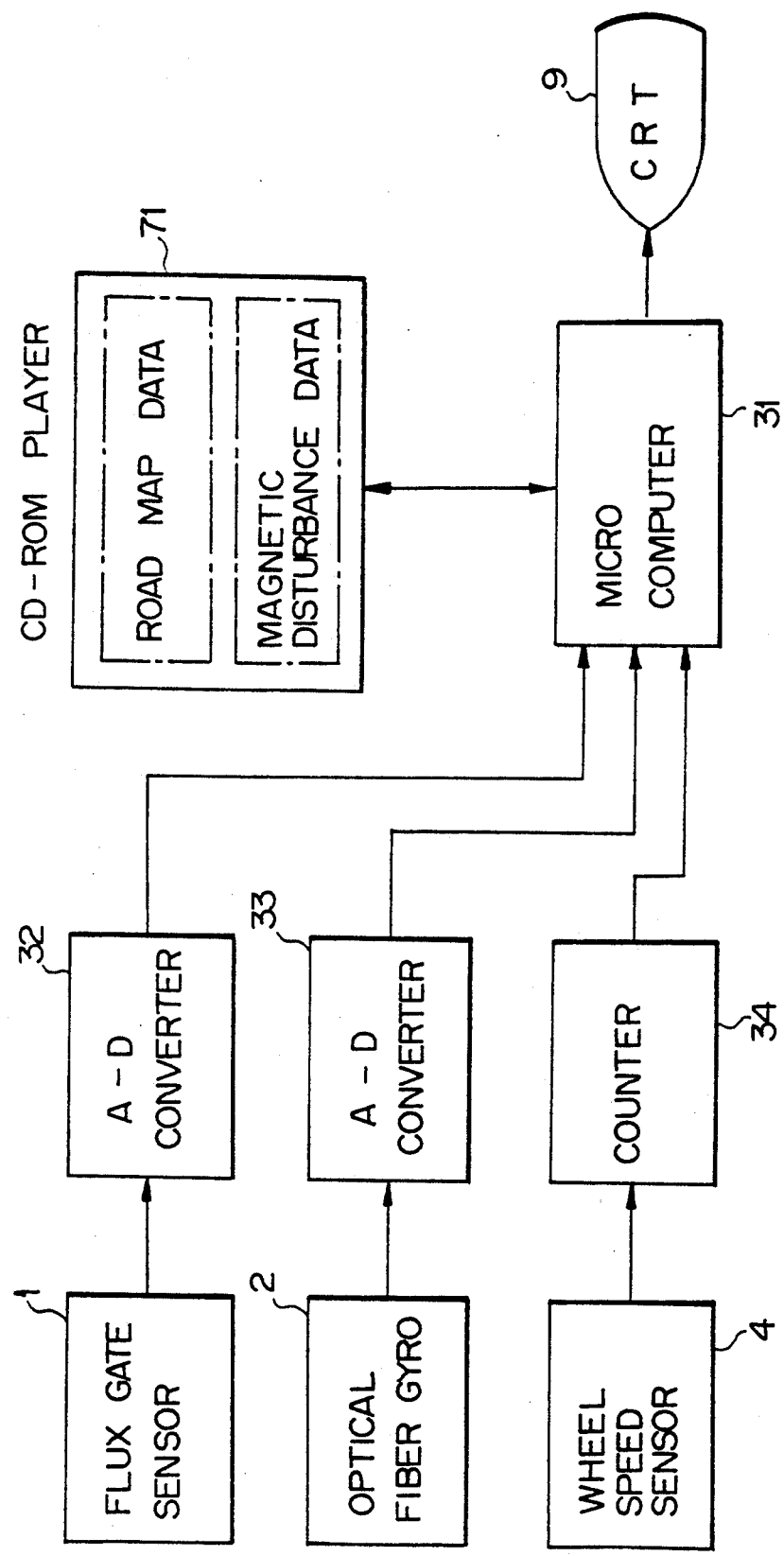
FIG. 8 shows a construction of a navigation system.

Practically, a CD-ROM player is used as the road map storing unit 5 and the disturbance data storing unit 7, and the locating position calculating unit 6 and the ratio changing unit 8 are realized by a microcomputer. FIG. 8 shows a construction of this navigation system. In FIG. 8, a flux gate sensor 1, an optical fiber gyro 2, and A-D converters 32, 33 are the same as those shown in FIG. 2. A wheel speed sensor 4A detects a rotating angle of wheels and outputs a signal having a number of pulses corresponding to the rotating angle. These pulses are counted at a counter 34. A microcomputer 31 detects the value of the counter 34 and calculates the driving distance. Further, the microcomputer calculates a locating position from the driving direction and the driving distance. C-D ROMs set in a C-D ROM player 71 include information of road map data and magnetic disturbance data. The microcomputer 31 reads the information of road map data and, practically, compensates the locating position by a map matching method. The microcomputer 31 sends data of the locating position and map data, and the locating position and the map are displayed on a CRT display 9. The microcomputer 31 reads the data of the magnetic disturbance at, the locating position and determines the ratio W of the weighted mean process.

Figure 9:
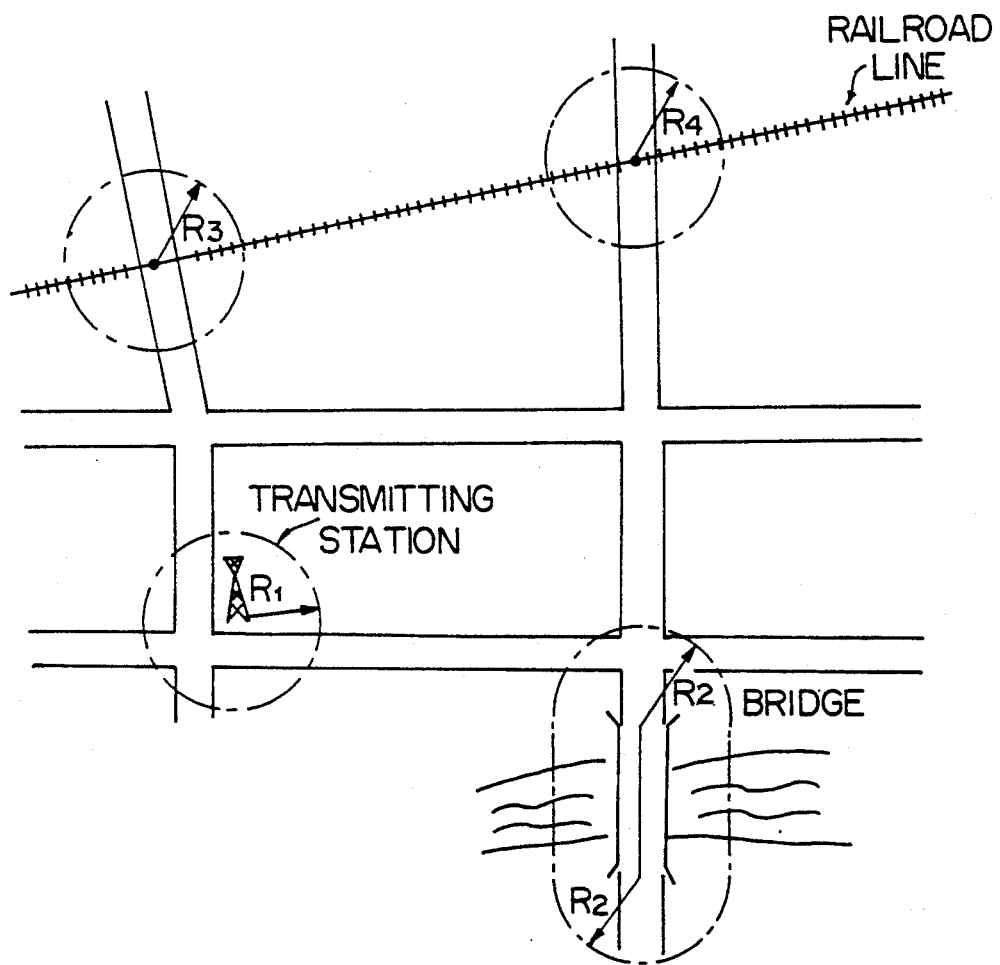
FIG. 9 shows an example of magnetic disturbance data.

In this embodiment, the magnetic disturbance data includes locating positions of specific facilities and respective disturbance ranges of the specific facilities in which each disturbance of the specific facility to earth magnetism is more than a predetermined level. FIG. 9 shows an example of this magnetic disturbance data. This data includes a transmitting station, a bridge and a railroad line as specific facilities. The disturbance range of the transmitting station is a circle of a radius $R_1$. Therefore, the data relating to the transmitting station can be expressed by co-ordinate values of the locating position and the radius $R_1$. The disturbance range of the bridge can be expressed as shown in FIG. 9. The data relating to the bridge can be expressed by co-ordinate values of center positions of two semicircles and the radius $R_2$. The disturbance range of the railroad line spreads along the line. However, the practical influence ranges are limited to crossing areas. Therefore, in this embodiment, the disturbance range of the railroad line is expressed by locating positions of crossings and the radius of circles centering at the crossings.

The disturbance ranges of the specific facilities shown in FIG. 9 are comparatively small. However, several types of specific facilities have large disturbance ranges. A high level road, a transmission line are included in these types of facilities. Furthermore, a railroad line also has a large disturbance range when the railroad extends parallel to a road. When specific facilities have large or long disturbance ranges, the disturbance ranges cannot be expressed by a pair of co-ordinate values and a radius. In these cases, disturbance ranges can be expressed by a chain of positions and widths. This width corresponds to the radius.

FIG. 10 shows an example of the format of the magnetic disturbance data. The large disturbance range is expressed by several points.

The compensated driving direction of a vehicle is calculated with the normal ratio $W_0$ when the vehicle drives in a normal area except that the disturbance range and the ratio W changes to $W_x$. $W_x$ which is smaller than $W_0$. Namely, the contribution ratio of the earth magnetism sensor is reduced in the disturbance range.

Figure 11B:
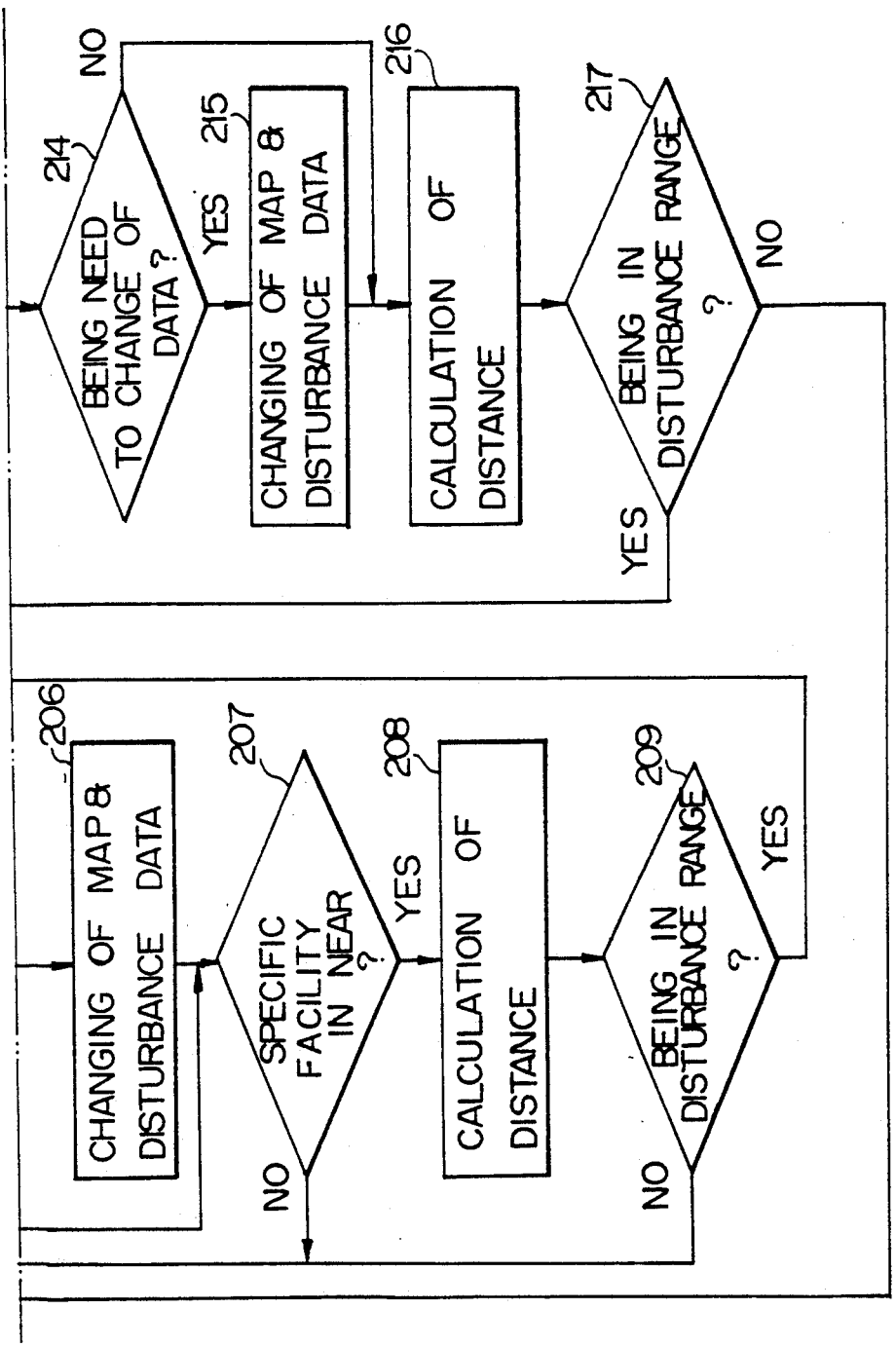
FIG. 11 comprises FIGS. 11A and 11B which show a flow-chart of an operation of a microcomputer shown in FIG. 8.

FIGS. 11A and 11B show a flow-chart of the microcomputer operation for changing the weighted mean ratio W according to a locating position. An initialization is performed at step 200 in FIG. 11A. A reference direction setting process and a starting position setting process are included in this initialization. At step 201, the ratio W is set to $W_0$ for the normal range. At step 202, the microcomputer 31 detects the output of the flux gate sensor 1 and the optical fiber gyro 2 and calculates the compensated driving direction by the ratio $W_0$. At step 203, the microcomputer 31 detects the output of the wheel speed sensor 4A and calculates the driving distance. At step 204, the microcomputer 31 calculates the locating position from the driving direction and the driving distance.

At step 205, it is determined whether or not the road map data in the microcomputer 31 is appropriate to the locating position, because the necessary road map data changes according to the locating position. If the change of the road map data is necessary, the microcomputer 31 reads the road map data and the magnetic disturbance data, corresponding to the locating position at step 206 in FIG. 11B. If it is not necessary, the control jumps to step 207.

At step 207, it is determined whether or not there are specific facilities in the neighborhood of the locating position. If there are no specific facilities, the control returns to step 202 in FIG. 11A. If here are, the distances from the locating position to the specifications are calculated at step 208 in FIG. 11B. Then, it is determined whether or not the locating position is within the disturbance range of the specific facilities. If the locating position is out of the disturbance range, the control returns to step 202. If the locating position is within the disturbance range, the control proceeds to step 210 in FIG. 11A.

At step 210, the ratio W is set to $W_x$. The operations from step 211 through 215 are the same as those of step 202 through 206 except the ratio W is different. Further, the operations from step 216 to 217 are the same as those of step 208 to 209. If the locating position is still within the disturbance range in step 217, the control returns to step 211. If the locating position is out of the disturbance range, the control returns to step 201.

If $W_x$ is 0, the compensated driving direction is determined only by the output of the rate gyro sensor within the disturbance range.

Further, if $W_0$ is 1, the compensated driving direction is determined only by the output of the earth magnetism sensor out of the disturbance range.

In the above embodiment, the ratio W changes between $W_0$ and $W_x$ whether the locating position is within the disturbance range or not. Namely, the ratio W changes like a step function. However, in practice, the specific facility continuously disturbs the magnetic field. Therefore, if the ratio W changes according to the intensity of the disturbance, the compensated driving direction can improve. An embodiment in which the ratio W continuously changes according to the intensity of the disturbance is described next.

Figure 12:
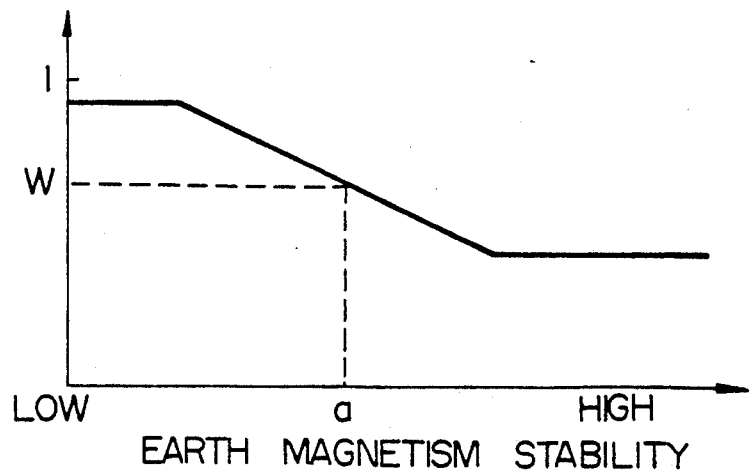
FIG. 12 shows an example of a function of a weighted mean ratio which changes according to the stability of earth magnetism.

Generally, the disturbance intensity changes according to the square of the distance from the specific facility. Therefore, when the magnetic disturbance data includes positions of the specific facility and intensities at centers, the disturbance intensity can be obtained by calculating the distance from the locating position to the specific facility. FIG. 12 shows an example of a function of the ratio W changing according to the earth magnetism stability. The earth magnetism stability corresponds to the disturbance intensity.

Figure 13:
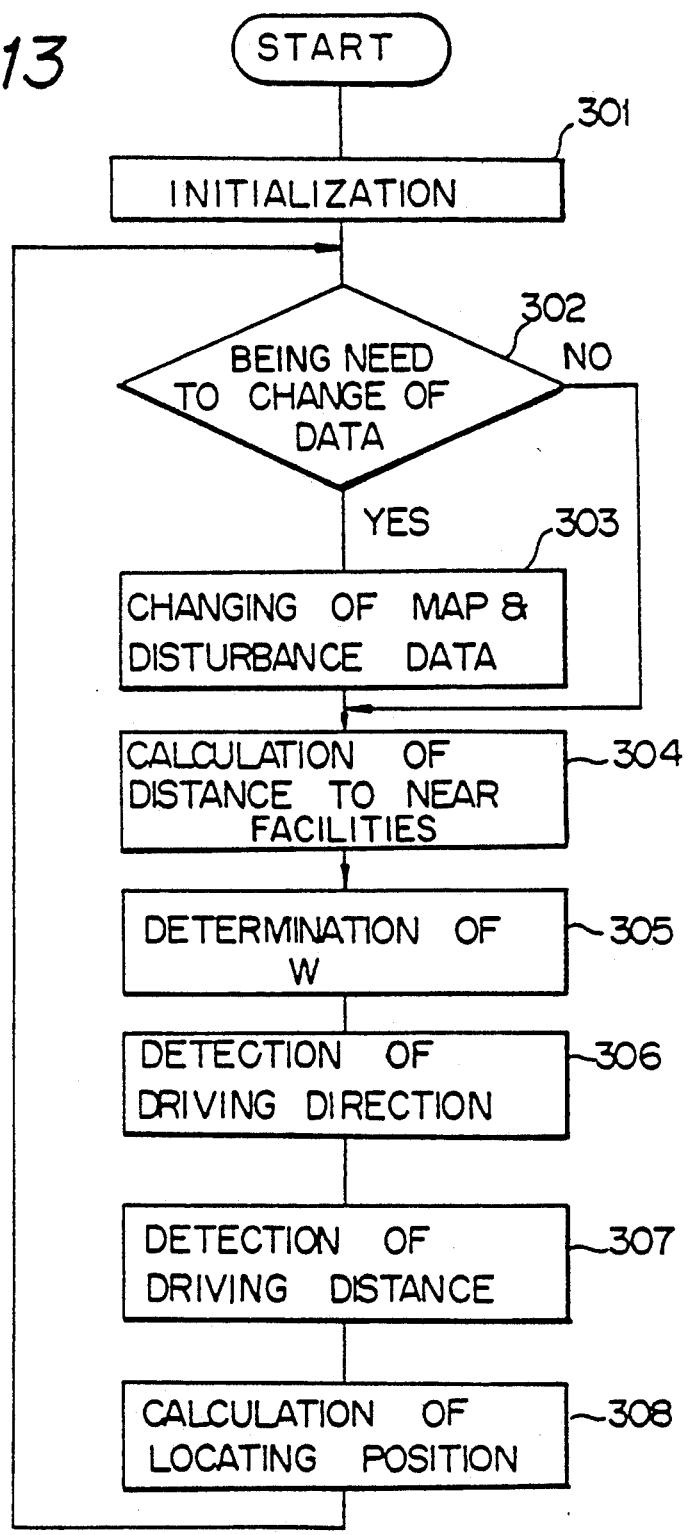
FIG. 13 shows a flow-chart of an operation of a microcomputer for continuously changing the ratio according to a magnetic stability.

FIG. 13 shows a flow-chart of the operation of the microcomputer in this embodiment. Since each of the operations is almost the same as that of FIG. 11, only the different steps are explained. At step 304, distances to specific facilities in the neighborhood of the locating position are calculated. At step 305, each disturbance intensity of the specific facility in the neighborhood is calculated, and a total disturbing intensity is calculated by adding all disturbance intensities. And then, the ratio W is determined according to the function shown in FIG. 12.

In the above embodiments, the magnetic disturbance data is expressed by specific facilities. The magnetic disturbance data can be expressed by another format. For example, all positions on the map are divided into several zones each of which respectively has the disturbance intensity of the same degree. And, the ratio W is determined according to where the locating position is in the zone. This magnetic disturbance data includes disturbances due to topological factors.

Further, in the above navigation system, the compensated driving direction is calculated by the weighted mean method. However, this weighted method mean uses for calculating the compensated driving direction according to the magnetic disturbance intensity at the locating position can be changed or substituted with other calculation processes or methods for calculating the compensated driving direction.

Many widely different embodiments of the present invention may be constructed without departing from the spirit and scope of the present invention, and it should be understood that the present invention is not limited to the specific embodiments described in this specification, except as defined in the appended claims.

We claim:

1. A driving direction sensor of a vehicle outputting a compensated direction, comprising:
   an earth magnetism sensor detecting a forward angle, forming the detected forward angle relative to magnetic north of earth, and outputting a first driving direction calculated from said detected forward angle;
   a rate gyro sensor, detecting a rotating speed, forming the detected rotating speed, calculating a rotated angle from the detected rotating speed, and outputting a second driving direction, obtained by adding said rotated angle to a reference direction; and
   direction compensating means for calculating the compensated direction, using a weighted mean process of said first driving direction from said earth magnetism sensor and said second driving direction from said rate gyro sensor, and for setting said compensated direction to said reference direction of said rate gyro sensor, wherein:
   said vehicle travels for a driving time, and
   said weighted mean process includes a weighted mean ratio that changes according to the driving time of said vehicle.

2. A driving direction sensor of a vehicle outputting a compensated direction, comprising:
   an earth magnetism sensor detecting a forward angle, forming the detected forward angle relative to magnetic north of earth, and outputting a first driving direction calculated from said detected forward angle;
   a rate gyro sensor, detecting a rotating speed, forming the detected rotating speed, calculating a rotated angle from the detected rotating speed, and outputting a second driving direction obtained by adding said rotated angle to a reference direction; and
   direction compensating means for calculating the compensated direction using a weighted mean process of said first driving direction from said earth magnetism sensor and said second driving direction from said rate gyro sensor, and for setting said compensated direction to said reference direction of said rate gyro sensor, wherein:
   a weighted mean ratio of said weighted mean process changes according to one of temperature of said rate gyro sensor and environment temperature.

3. A navigation system of a vehicle providing a locating position on a map, comprising:
   an earth magnetism sensor detecting a forward angle, forming the detected forward angle relative to magnetic north of earth, and outputting a first driving direction calculated from said detected forward angle;
   a rate gyro sensor, detecting a rotating speed, forming the detected rotating speed, calculating a rotated angle from the detected rotating speed, and outputting a second driving direction, obtained by adding said rotated angle to a reference direction;
   direction compensating means for calculating a compensated direction, using a calculating process receiving said first driving direction and said second driving direction;
   a driving distance sensor detecting a driving distance;
   map storing means for storing map information;
   locating position calculating means for calculating the locating position on said road map using said compensated direction received from said direction compensating means, said driving distance received from said driving distance sensor and said map information received from said map storing means;
   disturbance data storing means for storing distribution information indicating a magnetic disturbance having an intensity to an earth magnetism in a form corresponding to said map; and
   ratio changing means for detecting the intensity of the magnetic disturbance at said locating position received from said disturbance data storing means, and for ratio changing the calculating process used for calculating said compensated direction.

4. A navigation system as set forth in claim 3, wherein:
   said direction compensating means calculates the compensated direction, using a weighted mean process of said earth magnetism sensor and said rate gyro sensor, and for setting said compensated direction to said reference direction of said rate gyro sensor; and
   said ratio changing means changes a weighted mean ratio of said weighted mean process.

5. A navigation system as set forth in claim 4, wherein:
   said disturbance data storing means locates the locating position of specific facilities having respective influence ranges and disturbances to the earth magnetism of said specific facilities, each of the disturbances of said specific facilities to the earth magnetism being more than a predetermined level; and
   said ratio changing means comprises a distance calculating means for calculating distances between said specific facilities and said locating position, and changes said weighted means ratio irrespective of whether or not said location position is within said influence range.

6. A navigation system as set forth in claim 5, wherein said ratio changing means changes said weighted mean ratio of said first driving direction to zero, when said locating position is within said disturbance range.

7. A navigation system as set forth in claim 5, wherein said ratio changing means changes said weighted mean ratio between zero and one.

* * * * *

UNITED STATES PATENT AND TRADEMARK OFFICE
CERTIFICATE OF CORRECTION

PATENT NO. : 5,297,050
DATED : March 22, 1994
INVENTOR(S) : Atsushi ICHIMURA et al.

It is certified that error appears in the above-indentified patent and that said Letters Patent is hereby corrected as shown below:

Column 1, Line 62, after "to" insert --a-- and after "body" insert --,--.

Column 2, Line 7, after "magnetism" insert --sensor--.

Column 3, Line 29, change "rat" to --rate--.
Line 35, change ";" to --,--.

Column 4, Line 57, delete ",".

Signed and Sealed this

Sixth Day of September, 1994

Attest:

BRUCE LEHMAN

*Attesting Officer*  *Commissioner of Patents and Trademarks*